Nov. 6, 1923.
H. BAILEY
COUPLING
Filed Oct. 4, 1922
1,473,537
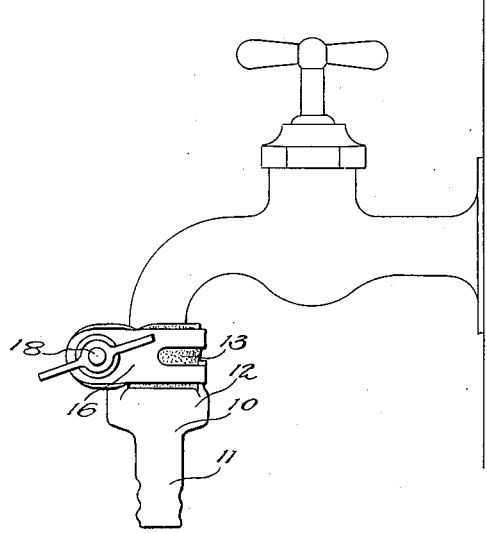
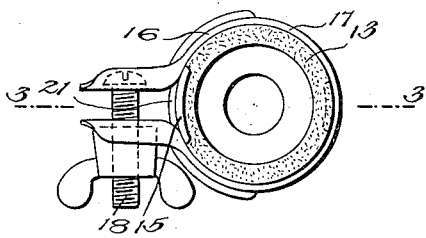
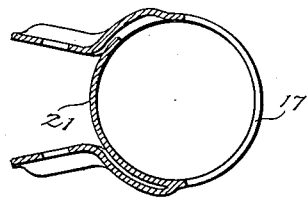
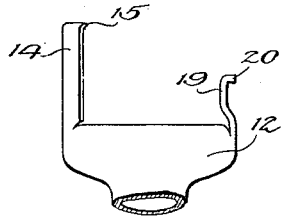
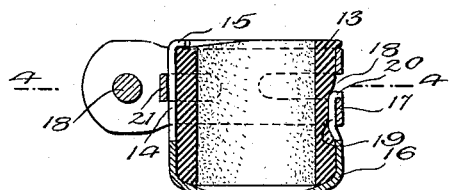
WITNESSES
H. T. Walker
E. W. Savage
INVENTOR
Hubert Bailey
BY Munn & Co
ATTORNEYS Patented Nov. 6, 1923.

1,473,537

UNITED STATES PATENT OFFICE.

HUBERT BAILEY, OF NEW YORK, N. Y.

COUPLING.

Application filed October 4, 1922. Serial No. 592,361.

*To all whom it may concern:*

Be it known that I, HUBERT BAILEY, a citizen of the United States, and a resident of the city of New York, borough of the Bronx, in the county of Bronx and State of New York, have invented new and useful Improvements in Couplings, of which the following is a full, clear, and exact description.

This invention relates to couplings and was primarily designed for use for connecting a hose to faucets of different sizes to be used in conjunction with a device such as that disclosed in my copending application, Serial No. 562,345, filed May 20, 1922.

The general object of this invention is the provision of a coupling for attaching a hose or the like to faucets of varying sizes.

This object is accomplished by providing a rigid reducing member, the lower end of which is threaded to receive a hose or the like, mounting in the upper end of the reducing member a flexible rubber sleeve, positioning on the upper end of the rubber sleeve a clamp for attaching the rubber sleeve to a faucet, and providing in conjunction with the rigid reducing member means for attaching the rubber sleeve in position in the reducing member, and means for retaining the clamp in position on the sleeve.

This and other objects of the invention will be more clearly understood from the following detailed description and accompanying drawings.

Figure 1 is a side elevation of a faucet, showing a coupling attached thereto;

Figure 2 is a top plan view of the coupling;

Figure 3 is a section along the line 3—3, Figure 2;

Figure 4 is a section along the line 4—4, Figure 3;

Figure 5 is a perspective view of the top portion of the reducing member.

Referring to the above-mentioned drawings, my invention consists of a rigid reducing member 10, the lower end 11 of which is of smaller diameter than the upper end 12. The lower end 11 is threaded for receiving a hose or the like while the upper end is shaped for receiving a flexible rubber sleeve 13. Attached to the upper end 12 of the reducing member 10 is a flexible arm 14 having its top turned inward, as shown at 15, for gripping the sleeve 13 to retain it in position in the reducing member. A clamp 16 including a band 17 and a bolt 18 for adjusting it is mounted on the upper end of the flexible sleeve 13. A slot 18 is provided in the band 17 and a flexible arm 19 attached to the upper end of the reducing member 12 is provided with an out-turned end 20 which engages in this slot 18. A curved plate 21 bridges the space between the ends of the band 17 and prevents the flexible sleeve from bulging at that point. The arm 14 extending upward from the end 12 of the reducing member is enclosed by the clamp 16 so that as the clamp is adjusted, reducing the diameter of the flexible sleeve, the flexible arm will still retain its grip upon the sleeve.

In the operation of this device the hose is projected over the lower end of the reducing coupling, the thread on the end 11 serving to retain the hose in position. The sleeve is then projected over the end of the faucet as shown in Figure 1 and the clamp 16 tightened. This clamp reduces the internal diameter of the sleeve 13 and forces it to tightly grip the faucet. The lower end of the sleeve still makes tight engagement with the ends 12 of the reducing member so that water passing through does not escape upward. In a construction like this one coupling may be so adjusted that it may be used with a large number of ordinary faucets which vary only slightly in size.

In some cases it may be difficult to adjust the coupling so as to grip certain faucets. If the faucet is too large for the convenient positioning of the coupling on the stem, a thin flexible sleeve 13 may be used, or if the faucet is so small that it is difficult to attach the coupling thereto a thick flexible sleeve or two or more flexible sleeves of different thickness may be used in the upper end of the reducing member. The coupling may also be suited for attachment to faucets of different shapes such as elliptical or the like.

I would state in conclusion that while the illustrated example constitutes a practical embodiment of the invention I do not limit myself strictly to the exact details herein illustrated since manifestly the same can be considerably varied without departing from the spirit of the invention as defined in the appended claims.

Claims:

1. A coupling, comprising a reducing member having a hose receiving nipple, a flexible sleeve mounted in the reducing member, an arm carried by the reducing member extending parallel to the flexible sleeve and having formed thereon a gripping member for projecting over the upper end of the sleeve, a clamping band having a slot therein mounted on the flexible sleeve, clamping arms formed integral with said clamping sleeve, means for operating said clamping arms to operate the clamping band, a curved plate carried by the clamping band and overlapping its ends, and a second resilient arm carried by the reducing member provided with a projection for extending through the slot in the clamping band to retain the latter in position on the flexible sleeve.

2. A coupling comprising a reducing member having a hose receiving nipple formed on its lower end, a flexible sleeve for mounting in the reducing member, a resilient arm formed integral with the reducing member and provided with a projection for projecting over the resilient sleeve to retain it in position, a clamping band having a slot formed therein mounted on the resilient sleeve, means mounted on the clamping band for operating it, a second resilient arm carried by the reducing member, said resilient arm being provided with a projection for engaging in the slot provided in the clamping band to retain the clamping band in position.

3. A coupling comprising a reducing member having a hose receiving nipple formed on its lower end, a resilient sleeve mounted in said reducing member, means carried by the reducing member for engaging the sleeve to retain it in position, a clamping band mounted on said resilient sleeve, a curved plate mounted on the clamping band and overlapping its ends, said plate being movable relative to one end of the clamping band, means for operating the clamping band, and means carried by the reducing member for retaining the clamping band in position on the resilient sleeve.

4. In a reducing coupling including a resilient sleeve, a clamping member for mounting on the resilient sleeve, comprising a clamping band having spaced ends, an operating arm attached to one end of the clamping band, said operating arm having a groove formed therein for receiving the other end of the clamping band which is slidably positioned therein, a second operating arm attached to the clamping band at a distance from the free end of the latter in alinement with said first-mentioned operating arm, and means for adjusting the operating arms relative to one another to operate the clamping band.

HUBERT BAILEY.